June 13, 1939.  A. LEGGE  2,162,224
RECEPTACLE
Filed Jan. 19, 1938
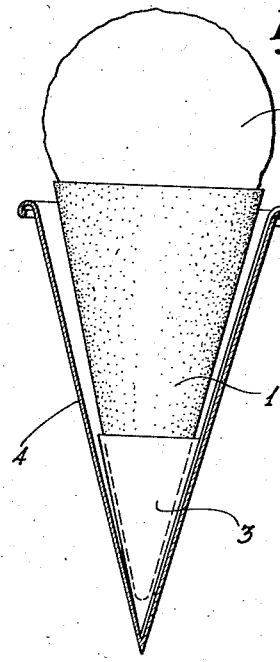
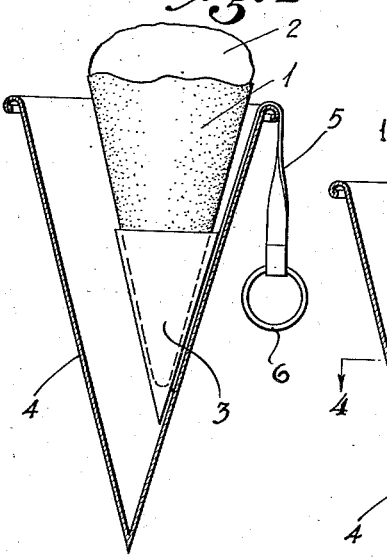
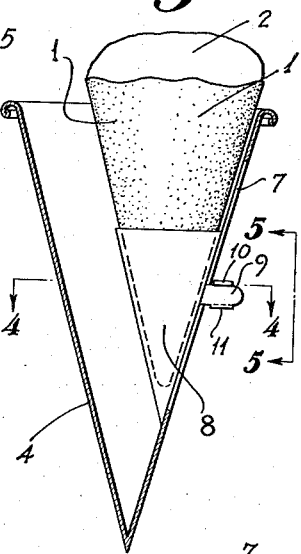
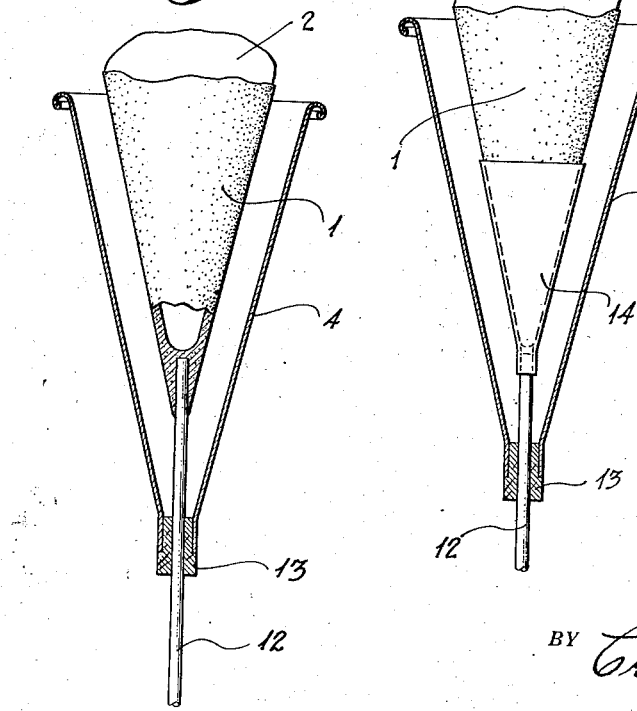
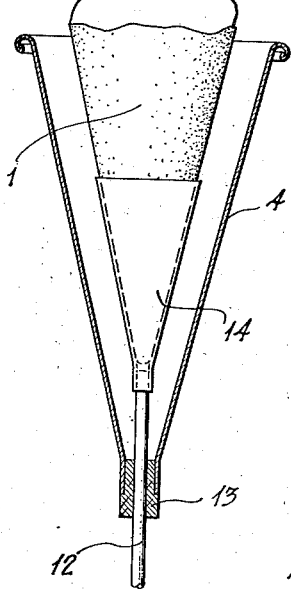
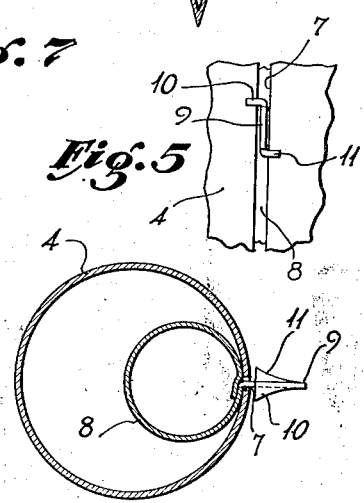
Algeo Legge, INVENTOR
BY Crosby Gauthier ATTORNEY Patented June 13, 1939

2,162,224

UNITED STATES PATENT OFFICE 2,162,224

RECEPTACLE

Algeo Legge, Los Angeles, Calif.

Application January 19, 1938, Serial No. 185,752

4 Claims. (Cl. 229—1.5)

This invention pertains to receptacles for use in the eating of ice cream cones and has for its object to prevent drippage of melted ice cream upon the clothing of the person eating the cone, while at the same time not presenting any impediment to the eating of the cone.

In the drawing which accompanies this specification I have illustrated four different specific embodiments of my invention, each of which is described hereinafter.

Referring to the drawing:

Fig. 1 is a sectional view of a drippage receptacle, conical in form, within which is shown a supporting receptacle in which an ice cream cone is inserted and supported and which supporting receptacle is capable of being elevated so as to lift the ice cream cone as it is being eaten;

Fig. 2 is a view similar to Fig. 1 but showing the supporting receptacle and ice cream cone in an elevated position—the ice cream cone having been partly eaten;

Fig. 3 illustrates another embodiment of my invention wherein the drippage receptacle is provided with a longitudinal slot which serves as a guide and means for holding in place the supporting receptacle—which latter slides upwardly along the interior conical surface of the drippage receptacle;

Fig. 4 is a sectional view taken along the line 4—4 of Fig. 3, and;

Fig. 5 is a fragmentary elevational view taken along the line 5—5 of Fig. 3;

Fig. 6 illustrates another embodiment of my invention wherein the ice cream cone is provided with a stick which extends thru the bottom of the drippage receptacle—which stick functions as the medium for elevating the ice cream cone as it is eaten;

Fig. 7 illustrates an embodiment of my invention very similar to that of Fig. 4 but comprising a supporting cone mounted on a stick.

Referring first to Figs. 1 and 2, there is shown an ice cream cone 1, filled with ice cream 2. The ice cream cone is shown inserted in a small conical receptacle 3, which is preferably made of tough paper or cardboard and which I call the supporting receptacle or supporting cone. The ice cream cone, together with its supporting cone 3 is disposed within another cone-shaped receptacle 4 which I call the drippage receptacle and which also is preferably made of tough paper or cardboard. Both the supporting cone and the drippage receptacle are preferably coated with paraffin so as to render them moisture-proof. Attached to one side of the supporting cone 3, as by riveting or gluing, is a cord or tape 5 which extends upwardly and over the edge of cone 4 and is provided at its end with a ring 6 large enough for the insertion of a finger. By pulling down on ring 6 the ice cream cone can be elevated as shown in Fig. 2.

The major part of the ball of ice cream 2 can be eaten while the cone is in its lowermost position, as illustrated in Fig. 1; but when the ice cream has been eaten to such an extent that the residue is no longer conveniently accessible, the cone is elevated, as shown in Fig. 2, by pulling on ring 6. Thus, practically the whole cone can be eaten without first removing it from the receptacle.

As the ice cream is eaten, or exposed to a melting temperature, the molten fluid runs down and is caught in the drippage receptacle 4—which serves to protect the consumer's clothing. The receptacle is inexpensive and is intended to be disposed of when the ice cream cone has been eaten.

In the structure of Fig. 3 the drippage receptacle 4 is provided with a longitudinal slot 7 (see also Figs. 4 and 5) and the supporting cone 8 is formed with a tab 9 which extends through slot 7 and serves as a handle by means of which the ice cream cone can be elevated. Slot 7 permits the supporting cone 8 to go all the way to the bottom of the drippage receptacle 4; but in Fig. 3 it is shown in an elevated position. In order to secure the supporting cone 8 in place, the tab 9 is provided with a pair of ears 10 and 11 which are bent over as shown most clearly in Figs. 4 and 5. By scoring the paper or cardboard forming the tab 9, it is possible very easily to form the ears 10 and 11 after the tab has been passed through the slot 7.

In the embodiment of Fig. 6 the ice cream cone 1 is provided with a molded-in stick 12, and the drippage receptacle 4 has a plug 13 bored to fit, slidably, the stick 12. The plug 13 is made, preferably, of a soft moisture-absorbent wood. As the ice cream cone is eaten it is pushed upwardly by means of the stick 12.

The structure of Fig. 7 is similar to that of Fig. 4 but differs therefrom in that the stick 12 is attached to a paper supporting cone 14 into which the ice cream cone is inserted.

What I claim is:

1. An article of the class described comprising, in combination, a drippage receptacle, a supporting receptacle within said drippage receptacle, said supporting receptacle being adapted to hold an ice cream cone, and means whereby said supporting receptacle together with said ice cream cone can be manually elevated relatively to said drippage receptacle.

2. An article of the class described comprising, in combination, a conical drippage receptacle, a supporting cone situated within said drippage receptacle and adapted to receive an ice cream cone, and a flexible cord attached to said supporting cone and extending over the upper edge of said drippage receptacle, said cord being operative, upon being pulled, to lift said supporting cone relatively to said drippage receptacle.

3. An article of the class described comprising, in combination, a conical drippage receptacle having a longitudinal slot, a supporting cone within said drippage receptacle, said supporting cone being adapted to hold an ice cream cone, said supporting cone having a tab extending through said slot, said tab being operative to serve as means for manually elevating said supporting cone within said drippage receptacle.

4. An article of the class described comprising, in combination, a conical drippage receptacle having an apertured plug in the apex end thereof, a stick extending through the aperture in said plug into the interior of said drippage receptacle, and a supporting cone attached to the end of said stick within said drippage receptacle, said supporting cone being adapted to hold and receive an ice cream cone, said stick being slidable lengthwise through said plug and operative to elevate said ice cream cone relatively to said drippage receptacle.

ALGEO LEGGE.